United States Patent
LoRicco et al.

(10) Patent No.: US 10,465,530 B2
(45) Date of Patent: Nov. 5, 2019

(54) GAS TURBINE ENGINE COMPONENT COOLING CAVITY WITH VORTEX PROMOTING FEATURES

(71) Applicant: UNITED TECHNOLOGIES CORPORATION, Farmington, CT (US)

(72) Inventors: Nicholas M. LoRicco, Coventry, CT (US); James T. Auxier, Bloomfield, CT (US); Brooks E. Snyder, Glastonbury, CT (US); Thomas N. Slavens, Vernon, CT (US)

(73) Assignee: United Technologies Corporation, Farmington, CT (US)

( * ) Notice: Subject to any disclaimer, the term of this patent is extended or adjusted under 35 U.S.C. 154(b) by 593 days.

(21) Appl. No.: 15/102,335

(22) PCT Filed: Nov. 17, 2014

(86) PCT No.: PCT/US2014/065858
§ 371 (c)(1),
(2) Date: Jun. 7, 2016

(87) PCT Pub. No.: WO2015/094531
PCT Pub. Date: Jun. 25, 2015

(65) Prior Publication Data
US 2016/0312624 A1   Oct. 27, 2016

Related U.S. Application Data

(60) Provisional application No. 61/919,286, filed on Dec. 20, 2013.

(51) Int. Cl.
F01D 5/18 (2006.01)
F01D 5/28 (2006.01)
(Continued)

(52) U.S. Cl.
CPC ............. *F01D 5/189* (2013.01); *F01D 5/187* (2013.01); *F01D 5/284* (2013.01); *F01D 9/02* (2013.01);
(Continued)

(58) Field of Classification Search
CPC .......... F01D 11/08; F01D 25/12; F01D 5/187; F01D 5/189; F01D 5/284; F01D 9/02;
(Continued)

(56) References Cited

U.S. PATENT DOCUMENTS 4,514,144 A * 4/1985 Lee ........................ B22C 9/04
  416/96 R
5,993,156 A * 11/1999 Bailly .................... F01D 5/187
  415/115
(Continued)

FOREIGN PATENT DOCUMENTS

EP   1882818 B1   5/2013
GB   2498551 A    7/2013
(Continued)

OTHER PUBLICATIONS

Extended European Search Report for Application No. EP 14 87 0702 dated Aug. 1, 2017.
(Continued)

*Primary Examiner* — Jesse S Bogue
(74) *Attorney, Agent, or Firm* — Carlson, Gaskey & Olds, P.C.

(57) ABSTRACT

A component according to an exemplary aspect of the present disclosure includes, among other things, a body, a wall extending inside of the body and a plurality of vortex promoting features arranged in a helical pattern along the wall.

9 Claims, 5 Drawing Sheets

(51) Int. Cl.
  *F01D 9/02* (2006.01)
  *F01D 11/08* (2006.01)
  *F01D 25/12* (2006.01)
  *F23R 3/00* (2006.01)

(52) U.S. Cl.
  CPC .............. *F01D 11/08* (2013.01); *F01D 25/12* (2013.01); *F23R 3/002* (2013.01); *F05D 2220/32* (2013.01); *F05D 2230/50* (2013.01); *F05D 2240/12* (2013.01); *F05D 2240/30* (2013.01); *F05D 2240/35* (2013.01); *F05D 2250/25* (2013.01); *F05D 2260/2212* (2013.01); *F05D 2260/2214* (2013.01); *F05D 2260/22141* (2013.01); *F05D 2300/13* (2013.01); *F05D 2300/20* (2013.01); *Y02T 50/676* (2013.01)

(58) Field of Classification Search
  CPC .............. F05D 2220/32; F05D 2230/50; F05D 2240/12; F05D 2240/30; F05D 2240/35; F05D 2250/25; F05D 2260/2212; F05D 2260/2214; F05D 2260/22141; F05D 2300/13; F05D 2300/20; F23R 3/002; Y02T 50/676
  See application file for complete search history.

(56) References Cited

U.S. PATENT DOCUMENTS

| | | | |
|---|---|---|---|
| 6,644,921 B2* | 11/2003 | Bunker | F01D 5/147 416/97 R |
| 7,563,072 B1* | 7/2009 | Liang | F01D 5/187 415/115 |
| 7,753,650 B1 | 7/2010 | Liang | |
| 7,785,071 B1 | 8/2010 | Liang | |
| 7,824,156 B2* | 11/2010 | Dellmann | F01D 5/187 416/96 R |
| 7,866,950 B1 | 1/2011 | Wilson, Jr. | |
| 7,901,180 B2 | 3/2011 | Abdel-Messeh et al. | |
| 8,047,789 B1 | 11/2011 | Liang | |
| 8,052,378 B2* | 11/2011 | Draper | F01D 5/186 415/115 |
| 8,057,183 B1 | 11/2011 | Liang | |
| 8,066,483 B1 | 11/2011 | Liang | |
| 8,096,766 B1 | 1/2012 | Downs | |
| 8,109,726 B2 | 2/2012 | Liang | |
| 8,162,609 B1 | 4/2012 | Liang | |
| 8,317,475 B1 | 11/2012 | Downs | |
| 8,322,988 B1 | 12/2012 | Downs et al. | |
| 8,376,706 B2* | 2/2013 | Bunker | F01D 5/187 416/96 R |
| 8,439,628 B2 | 5/2013 | Maldonado | |
| 2003/0086785 A1* | 5/2003 | Bunker | F01D 5/147 415/115 |
| 2006/0120868 A1 | 6/2006 | Dorling et al. | |
| 2007/0014664 A1* | 1/2007 | Dellmann | F01D 5/187 416/97 R |
| 2007/0297916 A1 | 12/2007 | Levine et al. | |
| 2009/0196733 A1 | 8/2009 | Murrow et al. | |
| 2009/0304494 A1* | 12/2009 | Strock | F01D 5/186 415/1 |
| 2010/0003619 A1 | 1/2010 | Das et al. | |
| 2010/0139903 A1 | 6/2010 | Hatman | |

FOREIGN PATENT DOCUMENTS

| | | |
|---|---|---|
| KR | 20110079075 A | 7/2011 |
| WO | 2004035992 A1 | 4/2004 |
| WO | 2014035992 A1 | 3/2014 |

OTHER PUBLICATIONS

International Search Report and Written Opinion of the International Searching Authority for International application No. PCT/US2014/065858 dated May 22, 2015.
International Preliminary Report on Patentability for PCT Application No. PCT/US2014/065858 dated Jun. 30, 2016.

* cited by examiner

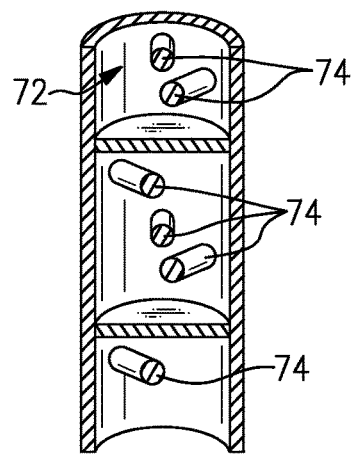 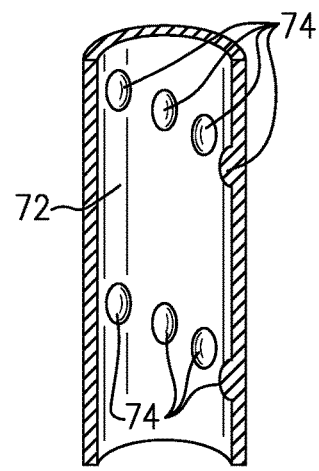 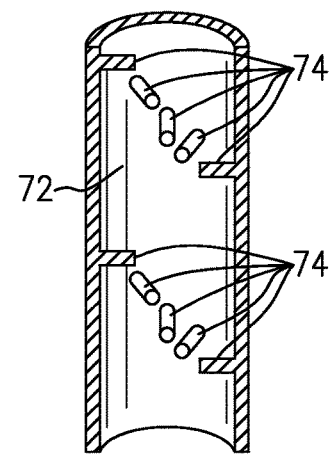
FIG. 7  FIG. 8  FIG. 9
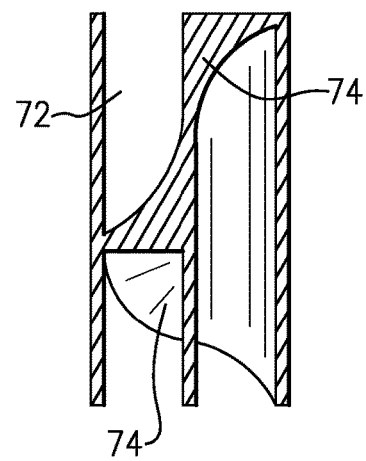
FIG. 10

GAS TURBINE ENGINE COMPONENT COOLING CAVITY WITH VORTEX PROMOTING FEATURES

BACKGROUND

This disclosure relates to a gas turbine engine, and more particularly to a gas turbine engine component that includes a cooling cavity. The cooling cavity may be provided with a plurality of vortex promoting features that induce a vortexing flow of a cooling fluid through the cavity.

Gas turbine engines typically include a compressor section, a combustor section, and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Due to their exposure to hot combustion gases, many gas turbine engine components employ internal cooling schemes that channel a dedicated cooling fluid for cooling the component. Thermal energy is transferred from the component to the cooling fluid as it circulates through the cooling scheme to convectively cool the component. Some cooling schemes may additionally rely on film cooling holes that return a portion of the cooling fluid to the gas path as a layer of film that protects the component against the relatively harsh environment of the gas path.

SUMMARY

A component according to an exemplary aspect of the present disclosure includes, among other things, a body, a wall extending inside of the body and a plurality of vortex promoting features arranged in a helical pattern along the wall.

In a further non-limiting embodiment of the foregoing component, the component is one of a blade, a vane, a blade outer air seal (BOAS), a combustor liner and a turbine exhaust case liner.

In a further non-limiting embodiment of either of the foregoing components, the wall circumscribes a cavity formed through the body.

In a further non-limiting embodiment of any of the foregoing components, the helical pattern extends along a direction of flow through the cavity.

In a further non-limiting embodiment of any of the foregoing components, the cavity includes a bowed shape.

In a further non-limiting embodiment of any of the foregoing components, the cavity includes a serpentine shape.

In a further non-limiting embodiment of any of the foregoing components, the cavity includes a helical shape.

In a further non-limiting embodiment of any of the foregoing components, the helical pattern is singularly helical.

In a further non-limiting embodiment of any of the foregoing components, the helical pattern is dually helical.

In a further non-limiting embodiment of any of the foregoing components, the helical pattern includes a first helix that extends in parallel with a second helix.

In a further non-limiting embodiment of any of the foregoing components, the helical pattern is multiply helical.

In a further non-limiting embodiment of any of the foregoing components, the plurality of vortex promoting features include at least one of pedestals, fins, ribs and hemispherical protrusions.

A gas turbine engine according to another exemplary aspect of the present disclosure includes, among other things, a component that defines a cavity configured to channel a cooling fluid to cool the component. The component includes a wall that at least partially circumscribes the cavity and a plurality of vortex promoting features arranged in a helical pattern along the wall and configured to induce a vortexing flow of the cooling fluid through the cavity.

In a further non-limiting embodiment of the foregoing gas turbine engine, the helical pattern extends along a direction of flow through the cavity.

In a further non-limiting embodiment of either of the foregoing gas turbine engines, the cavity includes one of a bowed, serpentine, helical, conical or contoured shape.

A method according to another exemplary aspect of the present disclosure includes, among other things, manufacturing a component to include a plurality of vortex promoting features arranged in a helical pattern along a wall of the component.

In a further non-limiting embodiment of the foregoing method, the method of manufacturing includes additively manufacturing a casting article layer-by-layer using an additive manufacturing process and casting the component to include the plurality of vortex promoting features using the casting article.

In a further non-limiting embodiment of either of the foregoing methods, the method of manufacturing includes building the component to include the plurality of vortex promoting features layer-by-layer using an additive manufacturing process.

In a further non-limiting embodiment of any of the foregoing methods, the component is made of a ceramic material.

In a further non-limiting embodiment of any of the foregoing methods, the component is made of a refractory metal.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 7 illustrates vortex promoting features of a cooling scheme.

FIG. 8 illustrates a second embodiment of vortex promoting features.

FIG. 9 illustrates another embodiment of vortex promoting features.

FIG. 10 yet another embodiment of vortex promoting features.

DETAILED DESCRIPTION

This disclosure is directed to a gas turbine engine component that includes one or more cooling cavities that employ vortex promoting features for inducing a vortexing fluid flow within the cavity. The vortex promoting features may be arranged in a helical pattern along the direction of flow through the cavity. Rotation of the cooling fluid along the helical path promotes a relatively high convective heat transfer coefficient, thereby removing additional amounts of heat from the component. The gas turbine engine component may be additively manufactured to include the vortex promoting features, or may be manufactured using an additively manufactured casting article that is configured to create the helical pattern inside the component during a casting process. These and other features are discussed herein.

Figure 1:
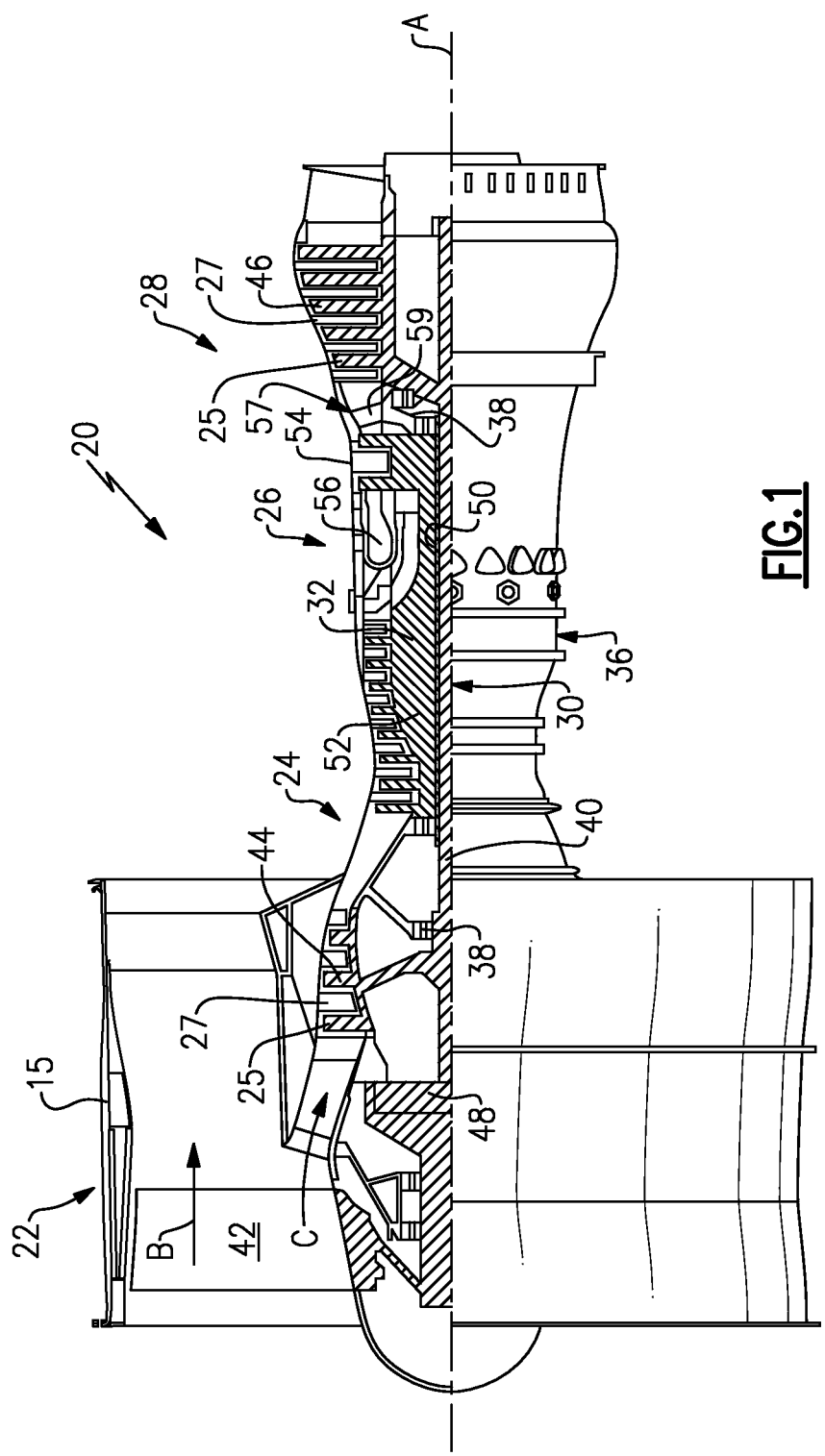
FIG. 1 illustrates a schematic, cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second.

Each of the compressor section 24 and the turbine section 28 may include alternating rows of rotor assemblies and vane assemblies (shown schematically). For example, the rotor assemblies can carry a plurality of rotating blades 25, while each vane assembly can carry a plurality of vanes 27 that extend into the core flow path C. The blades 25 create or extract energy in the form of pressure from the core airflow that is communicated along the core flow path C. The vanes 27 direct the core airflow to the blades 25 to either add or extract energy.

Various components of the gas turbine engine 20, including but not limited to the airfoils of the blades 25 and the vanes 27, may be subjected to repetitive thermal cycling under widely ranging temperatures and pressures. The hardware of the turbine section 28 is particularly subjected to relatively extreme operating conditions. Therefore, some components may require internal cooling schemes for cooling the parts during engine operation. Exemplary embodiments of such cooling schemes are discussed in greater detail below.

Figure 2A:
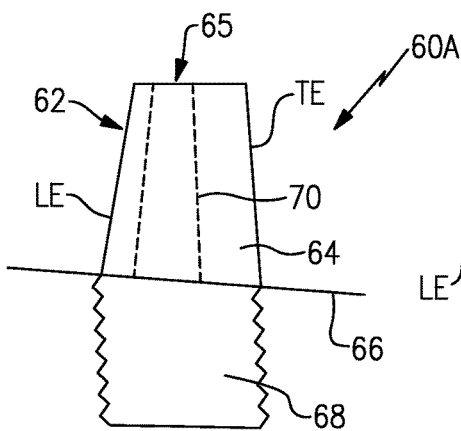
FIGS. 2A and 2B illustrate a first embodiment of a gas turbine engine component.
Figure 2B:
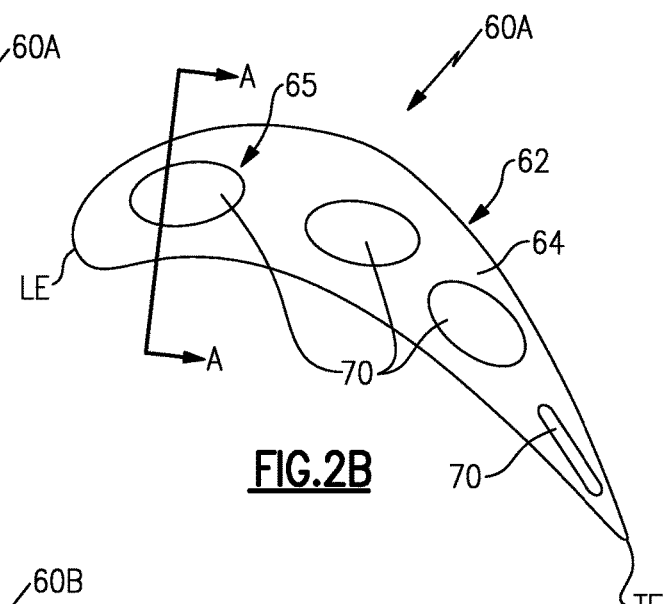

FIGS. 2A and 2B illustrate a component 60A having an internal cooling scheme 65 for cooling the component 60A. The component 60A may include a body 62 that defines both an external and internal shape of the component 60A. The body 62 extends between a leading edge LE and a trailing edge TE and may include an airfoil section 64, a platform 66 and a root 68. The airfoil section 64 extends outwardly in a first direction from the platform 66, and the root 68 extends from the platform 66 in an opposed, second direction away from the airfoil section 64.

The exemplary cooling scheme 65 may include one or more cavities 70 that are disposed through the body 62. The cavities 70 are shown schematically via dashed lines in FIG. 2A, and it is to be understood that the cooling scheme 65 is not limited to the number of cavities 70 depicted by these figures. Although not shown, the cavity 70 may be fed with a cooling fluid, such as relatively cool bleed airflow sourced from the compressor section 24, for convectively cooling the component 60A.

In one embodiment, the cavities 70 are main cooling cavities of the cooling scheme 65. The cavities 70 may extend radially, axially and circumferentially inside of the body 62.

In the embodiment illustrated by FIGS. 2A and 2B, the component 60A is a blade, such as a turbine blade. It is to be understood; however, that the cooling schemes described herein are not limited for use in turbine blades and can be also employed within vanes, blade outer air seals (BOAS), combustor liners, casing structures, turbine exhaust case liners, or any other gas turbine engine component that might benefit from dedicated internal cooling, including some compressor components.

Figure 3A:
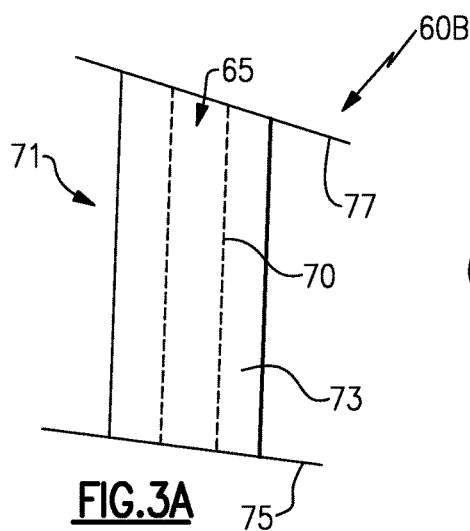
FIGS. 3A and 3B illustrate a second embodiment of a gas turbine engine component.
Figure 3B:
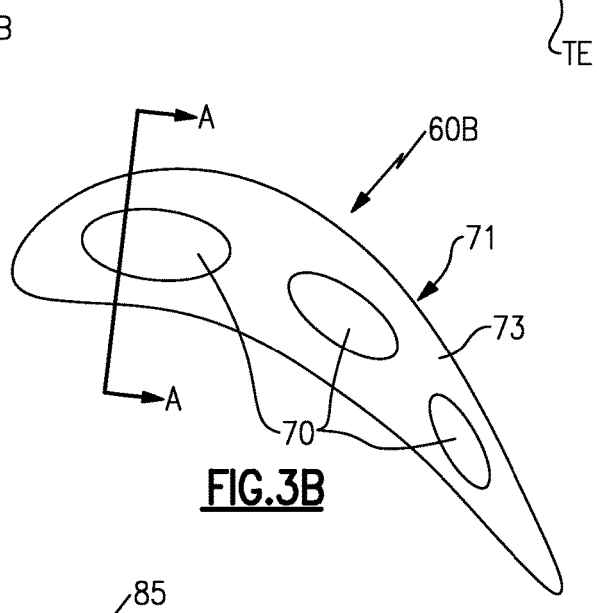

For example, a second non-limiting embodiment of a component 60B that may employ a cooling scheme 65 is illustrated by FIGS. 3A and 3B. In this embodiment, the component 60B is a vane. The component 60B may include a body 71 that includes an airfoil section 73 that extends between an inner platform 75 and an outer platform 77.

As discussed in greater detail below, the cooling schemes 65 described above may include a plurality of vortex promoting features that are arranged in a helical pattern to promote a vortexing flow of the cooling fluid communicated through the cavities 70. The vortexing flow of the cooling fluid through the cavities 70 promotes a higher convective heat transfer coefficient, thereby removing a greater amount of heat from the component and potentially reducing the need for film cooling.

Figure 4:
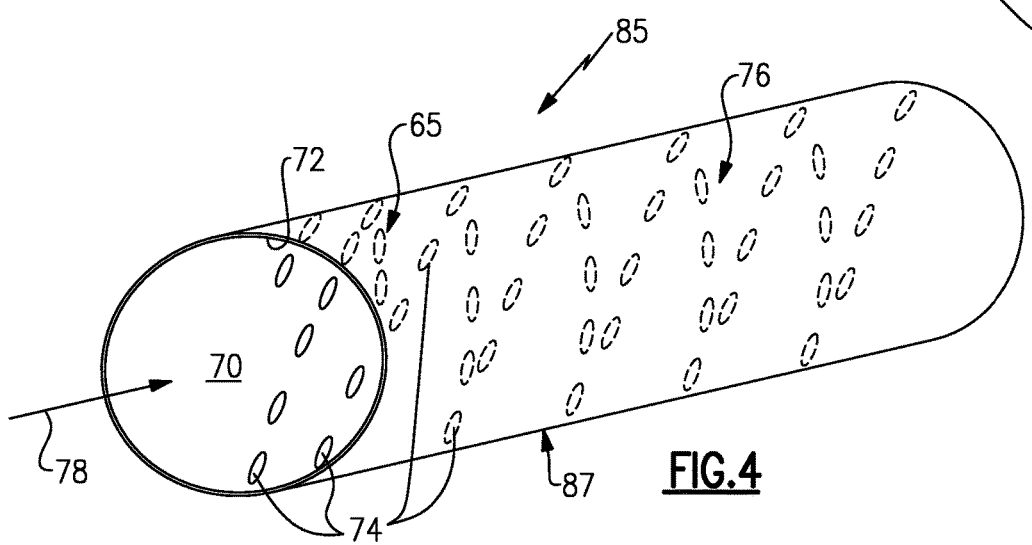
FIG. 4 illustrates an exemplary cooling scheme that may be employed by a gas turbine engine component.

FIG. 4 illustrates a portion of a cooling scheme 65 that includes a cavity 70 disposed inside of a gas turbine engine component 85. The gas turbine engine component 85 could be a blade or vane (similar to those shown in FIGS. 2A, 2B and 3A, 3B), or any other gas turbine engine component that may benefit from dedicated internal cooling.

In one embodiment, the gas turbine engine component 85 includes a wall 72 extending inside of a body 87. The wall 72 circumscribes the cavity 70 of the cooling scheme 65. For ease of illustration, only a single cavity 70 has been illustrated. In other words, the cooling scheme 65 could include many additional features, including cavities, microcircuits, etc., that are not shown in this particular embodiment.

A plurality of vortex promoting features 74 may be formed or otherwise disposed on the wall 72. In one embodiment, the vortex promoting features 74 are arranged in a helical pattern 76 along the wall 72. The helical pattern 76 may extend in a direction of flow 78 of the cooling fluid communicated within the cavity 70. In other words, the vortex promoting features 74 are implemented circumferentially in the cavity 70, varying in location along the direction of flow 78 within the cavity 70, to form the helical pattern 76. The helical pattern 76 may stretch over a portion of the cavity 70, or over the entire length of the cavity 70.

Figure 5:
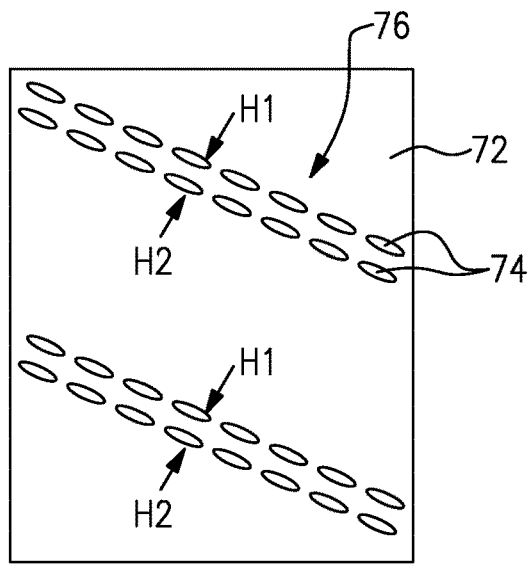
FIG. 5 illustrates a cooling scheme according to a second embodiment of this disclosure.
Figure 6:
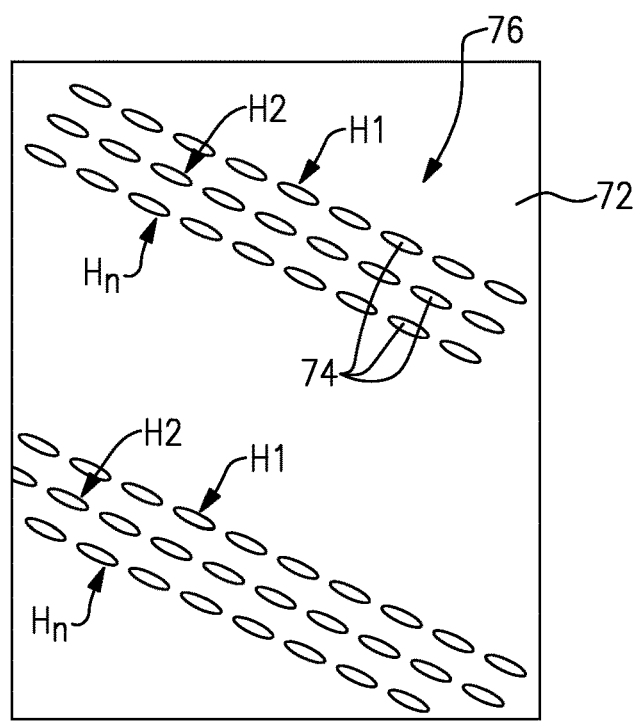
FIG. 6 illustrates a cooling scheme according to yet another embodiment of this disclosure.

In one embodiment, the helical pattern 76 may be singularly helical (see FIG. 4). In another embodiment, the helical pattern 76 may be dually helical (see FIG. 5). A dually helical pattern includes two spaced apart helixes H1 and H2 of vortex promoting features 74 that extend generally parallel to one another. In yet another embodiment, the helical pattern 76 may be made up of a plurality of helixes H1 to $H_n$ of vortex promoting features 74 (see FIG. 6). In other words, the helical pattern 76 may be made up of any number helixes that extend relative to one another in composition. The helical pattern 76 may have a constant or variable pitch and circumference, and can be arranged to extend in either a clockwise or counterclockwise direction.

The vortex promoting features 74 may also embody a variety of sizes, shapes and configurations. For example, by way of non-limiting embodiments, the vortex promoting features 74 may include pedestals (see FIG. 7), hemispherical protrusions (see FIG. 8), fins (see FIG. 9), ribs (see FIG. 10), or any other features. The views depicted in FIGS. 7-10 are similar to a view through section A-A of FIGS. 2B and 3B, for example.

Figure 11:
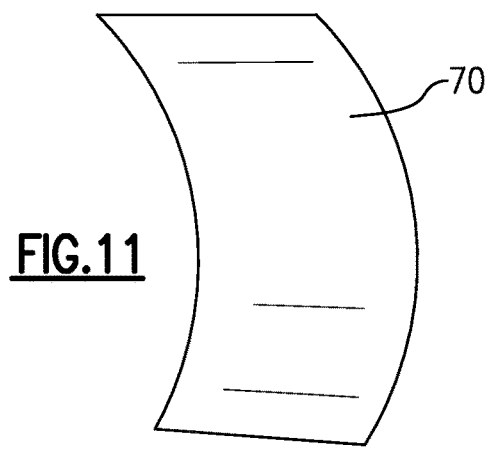
FIG. 11 illustrates a cavity of a cooling scheme.
Figure 12:
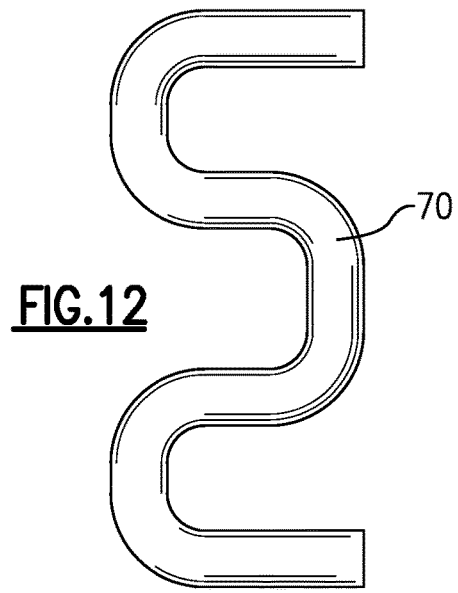
FIG. 12 illustrates another cavity of a cooling scheme.
Figure 13:
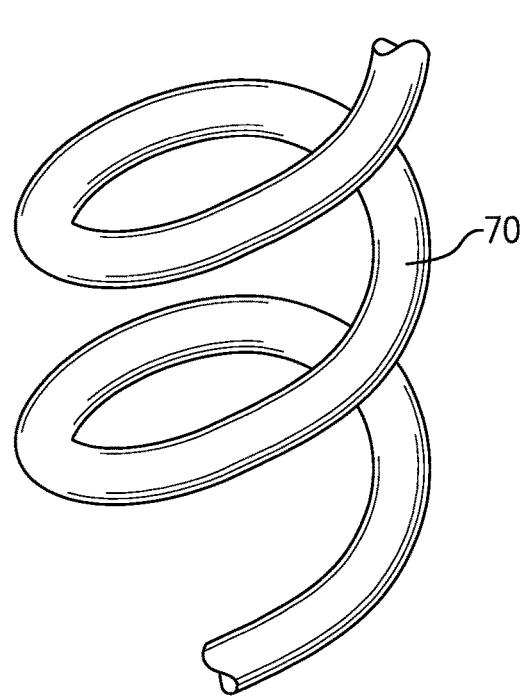
FIG. 13 illustrates yet another cavity of a cooling scheme.

The cavity 70 of the cooling scheme 65 could also embody any of a variety of shapes and configurations. For example, the cavity 70 depicted in FIG. 4 includes a straight shape. However, the cavity 70 could alternatively include a bowed shape (see FIG. 11), a serpentine shape (see FIG. 12), or a helical shape (see FIG. 13). Other three dimensional shapes, including but not limited to contoured shapes and conical shapes, are also contemplated as within the scope of this disclosure. In combination with the helical pattern 76 of vortex promoting features 74, the shape of the cavity 70 may further contribute to the creation of an internal vortex of fluid flow within the cavity 70, thereby improving heat transfer.

Figure 14:
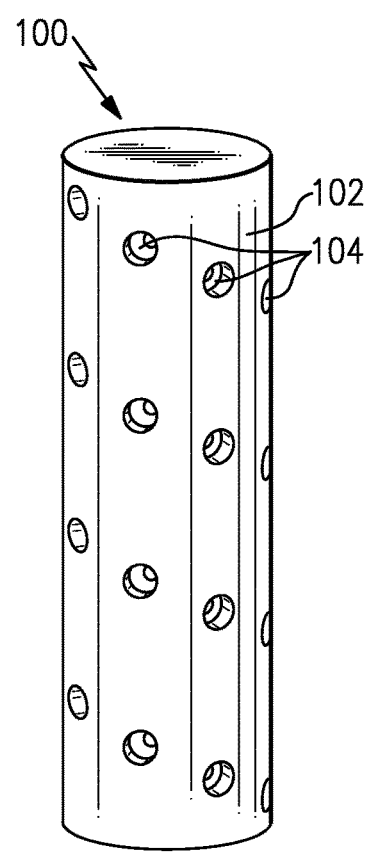
FIG. 14 illustrates a casting article that can be used to manufacture a gas turbine engine component that includes a cooling scheme with vortex promoting features.

FIG. 14 illustrates an exemplary casting article 100 that can be additively manufactured and subsequently used in a casting operation to cast a gas turbine engine component (e.g., gas turbine engine components 60A, 60B, 85 or any other gas turbine engine component) that includes vortex promoting features that are disposed in a helical pattern, such as illustrated in FIGS. 4-10.

The exemplary casting article 100 includes a body 102 having a plurality of indents 104 that extend into the body 102. In one embodiment, the indents 104 are arranged in a helical pattern in order to form vortex promoting features disposed in a helical pattern along a wall of a cast gas turbine engine component.

In one embodiment, the casting article 100 is a casting core. However, a shell, gating, or other casting articles may also be additively manufactured and used to create a gas turbine engine component having vortex promoting features that are disposed in a helical pattern.

In one non-limiting additive manufacturing process, the casting article 100 is built layer-by-layer by delivering a powdered material, such as a ceramic material or refractory metal material, to a build platform. A layer of the powdered material is then melted at locations where the geometry of the casting article 100 is to exist. A laser, electron beam melting device or any other melting device may be used to melt the layers of powdered material. The build platform may then be moved and a second layer of powered material may be added and melted to prepare a second layer of the casting article. This layer-by-layer process may be repeated until the entire casting article 100 has been additively built.

In one embodiment, the layers of the casting article 100 may be joined to one another with reference to CAD data that defines a cross-section of a desired geometry of the casting article 100. Once additively manufactured, the casting article 100 may be used in a casting process to manufacture a gas turbine engine component having vortex promoting features arranged in a helical pattern. Alternatively, in another embodiment, the entirety of the gas turbine engine component may be additively manufactured to include vortex promoting features arranged in a helical pattern.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A component, comprising:
   a body;
   a wall extending inside of said body and circumscribing a cavity formed through said body; and
   a plurality of vortex promoting features extending from said wall inward into said cavity and arranged in a dually helical pattern along said wall, wherein said plurality of vortex promoting features include at least one of pedestals and hemispherical protrusions, and said dually helical pattern includes a first helix formed by a first group of the plurality of vortex promoting features that extends in parallel with a second helix formed by a second group of the plurality of vortex promoting features wherein said helical pattern extends along a direction of flow through the cavity and has a varying pitch.

2. The component as recited in claim 1, wherein said component is one of a blade, a vane, a blade outer air seal (BOAS), a combustor liner and a turbine exhaust case liner.

3. The component as recited in claim 1, wherein said cavity includes one of a bowed, serpentine, helical, conical or contoured shape.

4. The component as recited in claim 1, wherein said cavity includes a bowed shape.

5. The component as recited in claim 1, wherein said cavity includes a serpentine shape.

6. The component as recited in claim 1, wherein said cavity includes a helical shape.

7. The component as recited in claim 1, wherein said plurality of vortex promoting features are implemented circumferentially in said cavity and vary in location relative to one another along a direction of flow within said cavity.

8. A gas turbine engine, comprising:
   a component that defines a cavity configured to channel a cooling fluid to cool said component, said component including:
   a wall that at least partially circumscribes said cavity; and
   a plurality of vortex promoting features extending from said wall inward into said cavity and arranged in a dually helical pattern along said wall and configured to induce a vortexing flow of said cooling fluid through said cavity, wherein said plurality of vortex promoting features include at least one of pedestals and hemispherical protrusions, and said dually helical patterns includes a first helix formed by a first group of the plurality of vortex promoting features that extends in parallel with a second helix formed by a second group of the plurality of vortex promoting features wherein said helical pattern extends along a direction of flow through the cavity and has a varying pitch.

9. The gas turbine engine as recited in claim 8, wherein said cavity includes one of a bowed, serpentine, helical, conical or contoured shape.

* * * * *